United States Patent
Teranishi

(10) Patent No.: US 8,949,609 B2
(45) Date of Patent: *Feb. 3, 2015

(54) ANONYMOUS AUTHENTICATION SIGNATURE SYSTEM, USER DEVICE, VERIFICATION DEVICE, SIGNATURE METHOD, VERIFICATION METHOD, AND PROGRAM THEREFOR

(75) Inventor: Isamu Teranishi, Tokyo (JP)

(73) Assignee: NEC Corporation, Tokyo (JP)

(*) Notice: Subject to any disclaimer, the term of this patent is extended or adjusted under 35 U.S.C. 154(b) by 203 days.

This patent is subject to a terminal disclaimer.

(21) Appl. No.: 13/383,476

(22) PCT Filed: Jul. 6, 2010

(86) PCT No.: PCT/JP2010/061449
§ 371 (c)(1),
(2), (4) Date: Jan. 11, 2012

(87) PCT Pub. No.: WO2011/007697
PCT Pub. Date: Jan. 20, 2011

(65) Prior Publication Data
US 2012/0124379 A1    May 17, 2012

(30) Foreign Application Priority Data
Jul. 13, 2009   (JP) .................. 2009-164884

(51) Int. Cl.
*H04L 9/30*   (2006.01)
*H04L 9/32*   (2006.01)

(52) U.S. Cl.
CPC ............ *H04L 9/3218* (2013.01); *H04L 9/3249* (2013.01)
USPC ........... 713/175; 713/156; 713/158; 713/168; 713/176; 713/180; 380/28; 380/30; 380/282; 380/284

(58) Field of Classification Search
CPC ... H04L 9/3247; H04L 9/3249; H04L 9/3218; H04L 9/3255; H04L 2209/42; H04L 63/12

USPC ........... 713/158, 168, 175, 176, 180; 380/28, 380/30, 282, 284
See application file for complete search history.

(56) References Cited

U.S. PATENT DOCUMENTS

| | | | |
|---|---|---|---|
| 2009/0041239 A1 | 2/2009 | Teranishi | |
| 2009/0074188 A1* | 3/2009 | Furukawa | 380/277 |
| 2010/0169656 A1 | 7/2010 | Yoshida et al. | |

FOREIGN PATENT DOCUMENTS

| JP | 2001-188757 A | 7/2001 |
|---|---|---|
| JP | 2005-159463 A | 6/2005 |

(Continued)

OTHER PUBLICATIONS

Camenisch et al., "Efficient Attributes for Anonymous Credentions", CCS'08, Oct. 27-31, 2008, pp. 245-356.*
Backes et al., "Anonymous yet Accountable Access Control", WPES'05, Nov. 7, 2005.*
Camenisch, Jan, et al., "A Signature Scheme with Efficient Protocols", SCN, 2002, pp. 268-289.

(Continued)

*Primary Examiner* — Amare F Tabor
*Assistant Examiner* — Noura Zoubair
(74) *Attorney, Agent, or Firm* — Sughrue Mion, PLLC

(57) ABSTRACT

The user device includes: a recording unit which stores system parameters as respective parameters given in advance, a disclosure public key, a user public key, a user private key, a member certificate, and an attribute certificate; an input/output unit which receives input of the document from the user and an attribute the user intends to disclose; a cryptograph generating module which generates a cryptograph based on the inputted document, the attribute to be disclosed, and each of the parameters; a signature text generating module which generates a zero-knowledge signature text from the generated cryptograph; and a signature output module which outputs the cryptograph and the zero-knowledge signature text as the signature data. The user public key and the attribute certificate are generated by using a same power.

16 Claims, 12 Drawing Sheets

(56) References Cited

FOREIGN PATENT DOCUMENTS

| | | |
|---|---|---|
| JP | 2006-330462 A | 12/2006 |
| JP | 2008-131058 A | 6/2008 |
| WO | WO 2009-008069 A1 | 1/2009 |

OTHER PUBLICATIONS

Furukawa, Jun, et al., "An Efficient Group Signature Scheme from Bilinear Maps", IEICE Trans. Fundamentals, May 2006, pp. 1328-1338, vol. E89-A, No. 5.

* cited by examiner

ANONYMOUS AUTHENTICATION SIGNATURE SYSTEM, USER DEVICE, VERIFICATION DEVICE, SIGNATURE METHOD, VERIFICATION METHOD, AND PROGRAM THEREFOR

CROSS REFERENCE TO RELATED APPLICATIONS

This application is a National Stage of International Application No. PCT/JP2010/061449 filed Jul. 6, 2010, claiming priority based on Japanese Patent Application No. 2009-164884 filed Jul. 13, 2009 the contents of all of which are incorporated herein by reference in their entirety.

TECHNICAL FIELD

The present invention relates to an anonymous authentication signature system, a user device, a verification device, a signature method, a verification method, and a program therefore. More specifically, the present invention relates to an anonymous authentication signature system and the like capable of reducing the amount of calculations required for generating and verifying of an anonymous authentication certificate.

BACKGROUND ART

An anonymous authentication signature technique (Anonymous Credential) is a technique with which a user (signatory) who holds an anonymous authentication certificate having a plurality of attributes and a signature key substantiated thereby given by an authorizer can generate a signature for requesting disclosure of a part of the attributes of the anonymous authentication certificate for a document given by using those. The disclosed attribute and the fact that the signature is generated by the signature key based on a given anonymous authentication certificate can only be known from this signature.

In a case where a user rents a rental car, for example, it is possible to disclose only an own attribute of "having a driver's license" to a rental car company as an agency and rent a car while keeping anonymity through signing time information by using the anonymous credential. When there is a circumstance where it becomes necessary to clarify the attribute of the user such as a case where there is an accident or a crime committed by the rental car rented by the user, it is possible to specify the attribute of the user by making an inquiry to the agency or the authorizer (e.g., the police or a public safety commission).

The user is sensitive for leaks of personal information and the like, so that the user tries to keep the personal information disclosed to the agency to be as small as possible. Further, the agency tries to keep the amount of the personal information of the user to be held as small as possible, since the cost for managing the personal information is increased. Thus, the anonymous authentication technique is expected as a way to be able to provide a personal information using method effective for both the users and the agencies.

Non-Patent Document 1 discloses Camenisch-Lysyanskaya signature that is one of the techniques for achieving such anonymous authentication signature. It is assumed here that attributes allotted to each user are $\chi[1], \text{---}, \chi[n]$. A user discloses $\chi[i1], \text{---}, \chi[im]$ among those while hiding the remaining attributes $\chi[j1], \text{---}, \chi[jn\text{-}m]$, and generates signature data anonymously. Note that "n" and "m" are natural numbers, and $n > m$. Further, "i1" to "im" are set of m pieces of different natural numbers satisfying $1 \le i \le n$, and "j1" to "jn-m" is a set of n-m pieces of different natural numbers which satisfy $1 \le j \le n$ and are not included in "i1" to "im".

Each user has an own private key $\delta$ and a Camenisch-Lysyanskaya signature $(\beta, E, \kappa)$ for attributes $\chi[1], \text{---}, \chi[n]$. Note here that $(\beta, E, \kappa)$ is data satisfying a condition shown in a following Expression 1. $\Omega, \Phi, \Psi, H[1], \text{---}, H[n], N$ are public information, and N is RSA modulus (RSA=Rivest, Shamir and Adleman).

$$\Omega\Phi^\delta\Psi^\beta H[1]^{\chi[1]} \ldots H[n]^{\chi[n]} = E^\kappa \bmod N \qquad \text{[Expression 1]}$$

The user discloses $\chi[i1], \text{---}, \chi[im]$, and generates a knowledge signature text "Signature" showing that the user knows the data $(\delta, \beta, \chi[j1], \text{---}, \chi[jn\text{-}m])$ that satisfies the condition shown in Expression 1 described above (a first method).

Other than this, it is also possible to achieve the anonymous credential with a following method. Each user has Camenisch-Lysyanskaya signatures corresponding to each of a plurality of private keys owned by the user oneself. The sets of the private keys and the Camenisch-Lysyanskaya signatures are defined as the Camenisch-Lysyanskaya signatures $(\beta[n], E[n], \kappa[n])$ for the Camenisch-Lysyanskaya signatures $(\beta[1], E[1], \kappa[1]), \text{---}(\delta, \chi[n])$ for the private, keys $(\delta, \chi[1])$.

The user discloses $\chi[i1], \text{---}, \chi[im]$, and generates a knowledge signature text "Signature" showing that the user knows all the Camenisch-Lysyanskaya signatures $(\beta[n], E[n], \kappa[n])$ for the Camenisch-Lysyanskaya signatures $(\beta[1], E[1], \kappa[1]), \text{---}(\delta, \chi[im])$ for $(\delta, \chi[i1])$ (a second method).

Further, as technical documents related to this, there are following documents. Patent Document 1 discloses a service providing method with which a certificate for certifying that a property is issued via a proper guarantor device, and users can negotiate with each other anonymously by exchanging the certificates. Patent Document 2 discloses a certificate verification system with which a substituted certificate generated by eliminating user's privacy information from a certificate is issued to be used. Patent Document 3 discloses an attribute authentication system with which a received attribute certificate is used by applying modification or encryption thereon, and a server can verify it. Non-Patent Document 2 discloses an example of a signature method similar to the Camenisch-Lysyanskaya signature method.

Patent Document 1: Japanese Unexamined Patent Publication 2001-188757
Patent Document 2: Japanese Unexamined Patent Publication 2005-159463
Patent Document 3: Japanese Unexamined Patent Publication 2008-131058
Non-Patent Document 1: Jan Camenisch, Anna Lysyanskaya: A Signature Scheme with Efficient Protocols. SCN2002: 268-289
Non-Patent Document 2: Jun Furukawa, Hideki Imai: An Efficient Group Signature Scheme from Bilinear Maps. ACISP 2005: 455-467

Regarding the two methods described in BACKGROUND ART, the first method proves the knowledge of the number of pieces of data $(\delta, \beta, \chi[j1], \text{---}, \chi[jn\text{-}m])$ proportional to "n-m". The second method proves the knowledge of the number of pieces of data $(\beta[1], E[1], \kappa[1]), \text{---}(\beta[n], E[n], \kappa[n])$ proportional to "m".

Both methods are based on RSA, so that the length of the signature is long. Thus, both of the methods require a vast amount of calculations for a single power residue calculation. It is necessary to perform this calculation for the number of pieces of zero-knowledge to be proved. Thus, the number of times of power residue calculations when generating the signature text becomes proportional to "n-m" with the first method and proportional to "m" with the second method. In any case, there is no difference in respect that it is necessary to perform a vast amount of calculations. Further, the structure capable of overcoming this issue is not depicted in Patent Documents 1 to 3 and Non-Patent Documents 1, 2 described above.

An object of the present invention is to provide an anonymous authentication signature system, a user device, a verification device, a signature method, a verification method, and a program therefor, which are capable of performing generation and verification of an anonymous authentication certificate with a smaller amount of calculation by reducing the number of times of power residue calculations when generating a signature text.

DISCLOSURE OF THE INVENTION

In order to achieve the foregoing object, the anonymous authentication signature system according to the present invention is characterized as an anonymous authentication signature system constituted by mutually connecting a user device which generates and outputs signature data for a document inputted by a user and a verification device which verifies whether or not the signature data generated by the user device is proper and outputs a result thereof, wherein: the user device includes a first recording unit which stores first system parameters as respective first parameters given in advance, a disclosure public key, a user public key, a user private key, a member certificate, and an attribute certificate, an input/output unit which receives input of the document from the user and an attribute the user intends to disclose, a cryptograph generating module which generates a cryptograph based on the inputted document, the attribute to be disclosed, and each of the first parameters, a signature text generating module which generates a zero-knowledge signature text from the generated cryptograph, and a signature output module which outputs the cryptograph and the zero-knowledge signature text as the signature data; the verification device includes a second recording unit which stores second system parameter as respective second parameters given in advance, the disclosure public key, the user public key, and the attribute certificate, an input receiving module which receives the input of the document and the signature data from the user device, and a zero-knowledge certification verifying module which judges whether or not a zero-knowledge certification text is acceptable by verifying the zero-knowledge certification text contained in the signature data by using each of the second parameters, and receives the signature data when judged as acceptable; the user public key and the attribute certificate are generated by using a same power; and the signature text generating module of the user device combines a part of the user public key and a part of the attribute certificate corresponding to the attribute that is not disclosed to generate the zero-knowledge signature text showing that the combined data satisfies an expression defined in advance.

In order to achieve the foregoing object, the user device according to the present invention is a user device which generates and outputs signature data for a document inputted by a user, and the user device is characterized to include: a recording unit which stores system parameters as respective parameters given in advance, a disclosure public key, a user public key, a user private key, a member certificate, and an attribute certificate; an input/output unit which receives input of the document from the user and an attribute the user intends to disclose; a cryptograph generating module which generates a cryptograph from the inputted document, the attribute to be disclosed, and each of the parameters; a signature text generating module which generates a zero-knowledge signature text from the generated cryptograph; and a signature output module which outputs the cryptograph and the zero-knowledge signature text as the signature data, wherein the user public key and the attribute certificate are generated by using a same power; and the signature text generating module combines a part of the user public key and a part of the attribute certificate corresponding to an attribute that is not disclosed to generate the zero-knowledge signature text showing that the combined data satisfies an expression defined in advance.

In order to achieve the foregoing object, the verification device according to the present invention is a verification device which verifies whether or not signature data generated by a user device is proper and outputs a result thereof, and the verification device is characterized to include: a recording unit which stores system parameters as respective parameters given in advance, a disclosure public key, a user public key, and an attribute certificate; an input receiving module which receives input of a document from a user and the signature data; and a zero-knowledge certification verifying module which judges whether or not a zero-knowledge certification text is acceptable by verifying the zero-knowledge certification text contained in the signature data by using each of the parameters, and receives the signature data when judged as acceptable, wherein the user public key and the attribute certificate are generated by using a same power.

In order to achieve the foregoing object, the signature method according to the present invention is a signature method which generates and outputs signature data for a document inputted by a user, and the method is characterized to include: storing in advance system parameters as respective parameters given in advance, a disclosure public key, a user public key, a user private key, and a member certificate as well as an attribute certificate generated by using a same power as that of the user public key; receiving input of the document from the user and an attribute the user intends to disclose; generating a cryptograph based on the inputted document, the attribute to be disclosed, and each of the parameters; combining a part of the user public key and a part of the attribute certificate corresponding to the attribute that is not disclosed to generate a zero-knowledge signature text showing that the combined data satisfies an expression defined in advance; and outputting the cryptograph and the zero-knowledge signature text as the signature data.

In order to achieve the foregoing object, the verification method according to the present invention is a verification method which verifies whether or not signature data generated by a user device is proper and outputs a result thereof, and the method is characterized to include: storing in advance system parameters as respective parameters given in advance, a disclosure public key, a user public key, and an attribute certificate generated by using a same power as that of the user public key; receiving input of a document from a user and the signature data; judging whether or not a zero-knowledge certification text is acceptable by verifying the zero-knowledge certification text contained in the signature data by using each of the parameters; and receiving the signature data when judged as acceptable.

In order to achieve the foregoing object, the signature program according to the present invention is a signature program for generating and outputting signature data for a document inputted by a user, and the program is characterized to cause a computer which stores in advance system parameters as respective parameters given in advance, a disclosure public key, a user public key, a user private key, and a member certificate as well as an attribute certificate generated by using a same power as that of the user public key to execute: a procedure for receiving input of the document from the user and an attribute the user intends to disclose; a procedure for generating a cryptograph based on the inputted document, the attribute to be disclosed, and each of the parameters; a procedure for combining a part of the user public key and a part of the attribute certificate corresponding to the attribute that is not disclosed to generate a zero-knowledge signature text showing that the combined data satisfies an expression defined in advance; and a procedure for outputting the cryptograph and the zero-knowledge signature text as the signature data.

In order to achieve the foregoing object, the verification program according to the present invention is a verification program for verifying whether or not signature data generated by a user device is proper and outputting a result thereof, and the program is characterized to cause a computer which stores in advance system parameters as respective parameters given in advance, a disclosure public key, a user public key, and an attribute certificate generated by using a same power as that of the user public key to execute: a procedure for receiving input of the document from a user and the signature data; a procedure for judging whether or not a zero-knowledge certification text is acceptable by verifying the zero-knowledge certification text contained in the signature data by using each of the parameters; and a procedure for receiving the signature data when judged as acceptable.

As described above, the present invention is structured to generate a cryptograph by corresponding to the attribute the user is to disclose by using a user public key and an attribute certificate generated by using a same power, to combine the cryptograph and a part of the attribute certificate, and to generate a zero-knowledge signature text that is a signature text of knowledge showing that the combined data satisfies an expression defined in advance. Thus, it is possible to reduce the number of pieces of data that is required to be certified. This makes it possible to provide the anonymous authentication signature system, the user device, the verification device, the signature method, the verification method, and the program therefor, which exhibit an excellent feature of being able to perform generation and verification of the anonymous authentication certificate with a smaller amount of calculation by reducing the number of times of power residue calculations when generating a signature text.

BEST MODES FOR CARRYING OUT THE INVENTION

First Exemplary Embodiment

Figure 1:
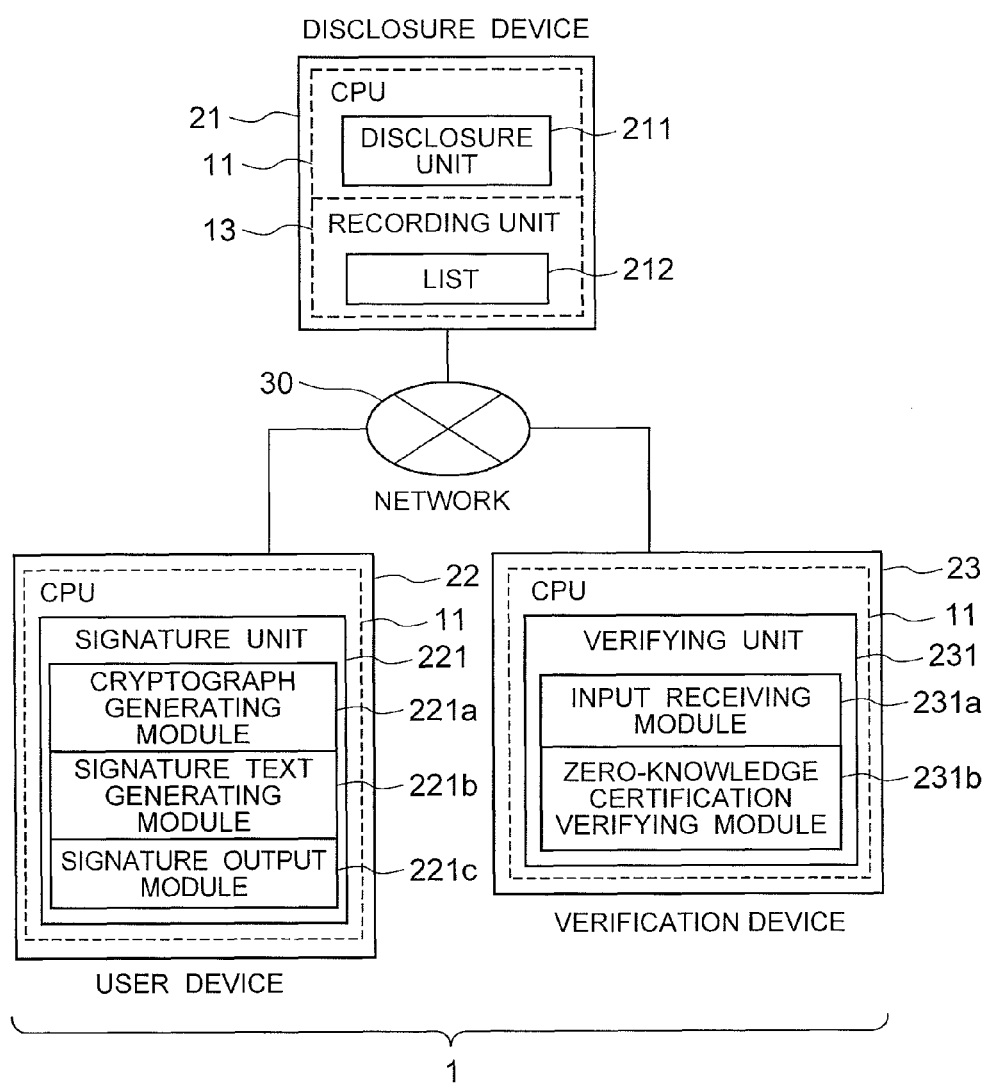
FIG. 1 is an explanatory chart showing the structure of an entire anonymous authentication signature system according to an exemplary embodiment of the invention.

Hereinafter, the structure of the first exemplary embodiment according to the invention will be described by referring to the accompanying drawings 1 and 2.

First, the basic contents of the exemplary embodiment will be described, and more specific contents will be described thereafter.

An anonymous authentication signature system 1 according to the exemplary embodiment is an anonymous authentication signature system constituted by mutually connecting a user device 22 which generates and outputs signature data for a document inputted by a user and a verification device 23 which verifies whether or not the signature data generated by the user device is proper and outputs the result. The user device 22 includes: a first recording unit 13 which stores first system parameters as respective first parameters given in advance, a disclosure public key, a user public key, a user private key, a member certificate, and an attribute certificate; an input/output unit 12 which receives a document from the user and input of attribute the user is to disclose; a cryptograph generating module 221a which generates a cryptograph from the inputted document, the attribute to be disclosed, and each of the first parameters; a signature text generating module 221b which generates a zero-knowledge signature text from the generated cryptograph; and a signature output module 221c which outputs the cryptograph and a zero-knowledge signature text as the signature data. The verification device 23 includes: a second recording unit 13 which stores second system parameters as respective second parameters given in advance, a disclosure public key, a user public key, and an attribute certificate; an input receiving module 231a which receives the document and the signature data from the user device; and a zero-knowledge certification verifying module 231b which verifies a zero-knowledge certification text contained in the signature data by using each of the second parameters to judge whether or not the zero-knowledge certification text is acceptable, and receives the signature data when judged as acceptable. Note here that the user public key and the attribute certificate are generated by using a same power, and that the signature text generating module 221a of the user device combines a part of the user public key and a part of the attribute certificate corresponding to the undisclosed attributes, and generates a signature text of knowledge regarding the fact that the combined data satisfies an expression defined in advance.

Note here that the recording unit 13 of the user device stores a group public key and a group private key as respective parameters given in advance, and the cryptograph generating module 221a generates a cryptograph from data corresponding to the attribute that is to be disclosed among the attribute certificate, the user public key, the user private key, the group public key, and the group private key. Further, the signature text generating module 221b generates a zero-knowledge signature text for the fact that the cryptograph generated by the cryptograph generating module is a cryptograph of the data contained in the user public key.

Further, the input receiving module 231a of the verification device receives input of the data of the attribute disclosed by the user, and the zero-knowledge certification verifying module 231b verifies the zero-knowledge certification text contained in the signature data by using the attribute disclosed by the user and each of the parameters. Furthermore, the recording unit 13 stores the group public key as the parameter given in advance, and the zero-knowledge certification verifying module 231b verifies the zero-knowledge certification text based on the data corresponding to the attribute disclosed by the user, the user public key, the group public key, and the group private key.

By employing the structure described above, the anonymous authentication signature system can reduce the number of times of power residue calculations when generating the signature text, and to perform generation and verification of the anonymous authentication certificate with a still smaller amount of calculation.

This will be described in more details hereinafter.

FIG. 1 is an explanatory chart showing the entire structure of the anonymous authentication signature system 1 according to the exemplary embodiment of the invention. The anonymous authentication signature system 1 is constituted by mutually connecting, via a network 30, the user device 22 which generates a signature based on an issued signature key, the verification device which verifies that the generated signature is generated by a specific signature key, and a disclosure device 21 which specifies the person who has generated the signature. The disclosure device 21, the user device 22, and the verification device 23 are all computer devices.

Figure 2:
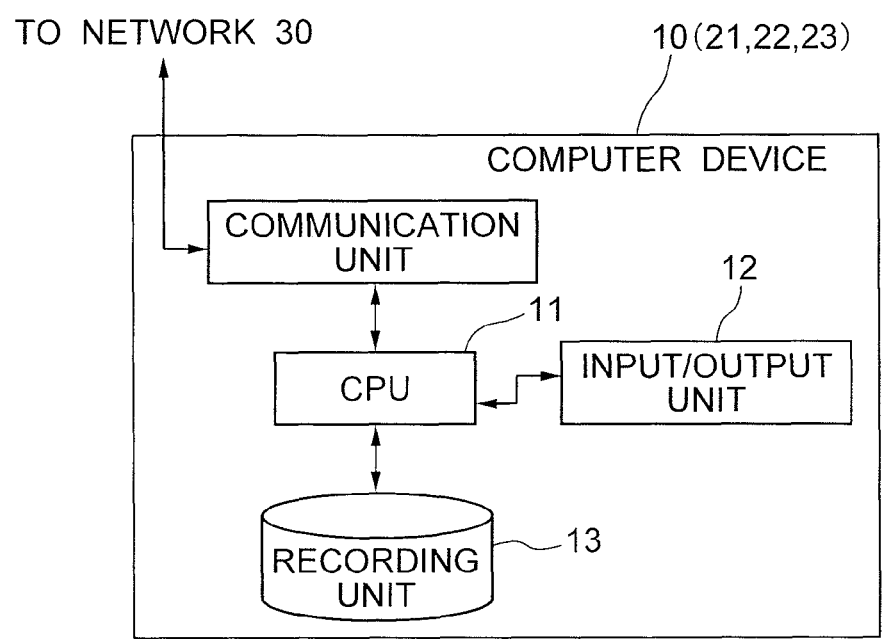
FIG. 2 is an explanatory chart showing the structure as hardware of a computer device functioning as a disclosure device, a user device, and a verification device shown in FIG. 1.

FIG. 2 is an explanatory chart showing the structure as hardware of a computer device 10 which functions as the disclosure device 21, the user device, and the verification device 23 shown in FIG. 1. The computer device 10 includes: an arithmetic operation unit 11 as a processor that is a main body for executing a computer program; the input/output unit 12 which inputs and outputs data; the recording unit 13 which stores the computer program and the data; and a communication unit 14 which performs data communications with other computer devices via the network 30.

The computer device 10 functions as each of the disclosure device 21, the user device 22, and the verification device 23 shown in FIG. 1 when each of the computer programs is executed by the arithmetic operation unit 11. That is, the disclosure unit 211 is operated in the arithmetic operation unit 11 that is provided to the disclosure device 21. The signature unit 221 is operated in the arithmetic operation unit 11 that is provided to the user device 22. The verifying unit 231 is operated in the arithmetic operation unit 11 that is provided to the verification device 23. Each of the functional modules is stored in advance to the recording units 13 of the respective computer devices 10, and is read by the arithmetic operation units 11 to be operated. The functions and operations of each of those functional units will be described later.

The signature unit 221 is further divided into functional units such as a cryptograph generating module 221a which generates a cryptograph "Cipher", a signature text generating module 221b which generates a signature text "Proof", and a signature output module 221c which outputs a signature "Signature" by combining the cryptograph "Cipher" and the signature text "Proof". Further, the verifying unit 231 includes an input receiving module 231a which receives the signature text "Signature" as input, and a zero-knowledge certification verifying module 231b which verifies the zero-knowledge certification text. The functions and operations of each of those functional units will also be described later.

In this exemplary embodiment, the data informed in advance to all the devices constituting the anonymous authentication signature system 1 and stored in the recording units 13 of each device is referred to as system parameters. More specifically, the system parameters herein are each of the followings.

(1) A prime number q
(2) Information sufficient for doing group operation on a group GRP[1] of the order q
(3) Information sufficient for doing group operation on a group GRP[2] of the order q
(4) Information sufficient for doing group operation on a group GRP[3] of the order q
(5) Information sufficient for doing group operation on a group GRP' of the order q
(6) Information sufficient for calculating bilinear mapping e from GRP[1]×GRP[2] to GRP[3]: GRP[1]×GRP[2]→GRP[3]
(7) Generation source Θ for generating GRP'

From the viewpoint of security, it is desirable to be difficult to solve a discrete logarithm problem on GRP[1], GRP[2], and GRP[3]. As examples of such group, there are an elliptic curve group and a prime-number order partial group thereof. The elliptic curve group is necessarily characterized by an algebraic equation "Y^2=X^3+aX+(b mod p)", so that it is possible to do a group operation on the elliptic curve group only with (a, b, p). In a case of using the prime-number order partial group of the elliptic curve group, the source for generating the partial group is also required. In this Description, "the square of Y", for example, is expressed as "Y^2" or so in sections other than a numerical expression.

Further, as the bilinear mapping e, Weil pairing or Tate pairing can be used, for example. From the viewpoint of security, it is desired to be difficult to solve a DDH problem (Computational Deffie-Hellman) on GRP'. As examples of such group, there are an elliptic curve group, a cyclic group, and a prime-number order partial group thereof.

In addition to those system parameters, a public key and a private key are given to the disclosure device 21. These are referred to as a disclosure device public key and a disclosure device private key, respectively. The disclosure device public key and the disclosure device private key are generated in advance, and stored in the recording unit 13 of the disclosure device 21. Further, the disclosure device public key is also distributed to the user device 22, and stored in the recording unit 13 of the user device 22. In this exemplary embodiment, the disclosure device public key is a set of two elements Γ and Λ of GRP', and the disclosure device private key is a set of two elements γ, λ of Z/qZ. Used therefore are those satisfying Expression 2.

$$\Gamma = \Theta^\gamma, \Lambda = \Theta^\lambda \quad \text{[Expression 2]}$$

In addition to those system parameters, a public key and a private key are given to the user device 22. These are referred to as a user device public key and a user device private key, respectively. The user device public key and the user device private key are generated in advance, and stored in the recording unit 13 of the user device 22. Further, the disclosure device 21 knows all the user device public keys of each user device 22, and a list 212 constituted with sets of IDs of each user device 22 and the user device public keys of the respective user devices 22 is stored in the recording unit 13 of the disclosure device 21. In this exemplary embodiment, the user device public key is an element Δ of the GRP', and the user device private key is an element δ of Z/qZ. Used therefore are those that satisfy Expression 3.

$$\Delta = \Theta^\delta \quad \text{[Expression 3]}$$

Further, in this exemplary embodiment, some kind of group constituted with the user devices 22 (individuals and parties managing the devices) is operated. An intrinsic public key is given to that group. This public key is referred to as a group public key. The group public key is distributed to each user device 22 in advance, and stored also in the recording units of the user devices 22. Hereinafter, it is assumed that there is only a single group for simplifying the explanations. However, the same applies to the cases where there are a plurality of groups.

In this exemplary embodiment, the group public key is a set of three elements Φ, Ψ, Ω of GRP[1] and two elements Y, Π of GRP[2]. π is an element that satisfies Expression 4, and this is the group private key.

$$\Pi = \Gamma^\pi \quad \text{[Expression 4]}$$

Information for certifying that the device belongs to the group is given to the user device 22 belonging to the group. This information is referred to as a member certificate. In this exemplary embodiment, the member certificate is a set of two elements β, κ of Z/qZ and an element E of GRP[1]. Used therefore are those satisfying Expression 5. Note that ρ=π+κ.

$$\Omega \Phi^\delta \Psi^\beta = E^\rho \quad \text{[Expression 5]}$$

Further, attributes χ[1], - - - , χ[n] of the user devices 22 (individuals and parties managing the devices) are given to each of the user devices 22 belonging to the group, and information certifying those attributes is given thereto further. This information is referred to as an attribute certificate. Specific attributes given for this attribute certificate may be name, sex, age, address, telephone number, possession of driver's license, subscribing condition of credit cards, pension information, and the like.

The attribute certificate is made depending on those attributes, so that n pieces of attribute certificates are to be given to the user device 22 to which the n pieces of attributes are given. In this exemplary embodiment, the attributes are expressed as an arbitrary bit sequence. In a case where the member certificate of the user device 22 is (β, κ, E), the attribute certificate G[i] corresponding to the attribute χ[i] of the user device 22 is the element of GRP[1] and it satisfies Expression 6.

Note here that Hash is a hash function which takes values on GRP[1], which is ρ=π+κ.

$$\text{Hash}(\chi[i]) = G[i]^\rho \quad \text{[Expression 6]}$$

In this exemplary embodiment, used are only the user devices 22 that belong to the group. Thus, unless there is some kind of specific notification, it is assumed that the user devices 22 belong to the group and the member certificate (β, κ, E) is given thereto in advance.

When a document M is inputted via the input/output unit 12, the user device 22 executes the signature unit 221 to generate a signature text "Signature" which is to be attached to the document M. The document M and the attributes χ[i1], - - - , χ[im] to be disclosed by the user are inputted to the signature unit 221.

It is assumed here that the entire attributes allotted to each user are χ[1], - - - , χ[n] and the user discloses χ[i1], - - - , χ[im] while intending to hide the remaining attributes χ[j1], - - - , χ[jn-m]. Note here that "n" and "m" are natural numbers, and n>m. Further, "i1" to "im" are set of m-pieces of different natural numbers satisfying 1≤i≤n, and "j1" to "jn-m" are set of "n-m"-pieces of different natural numbers which satisfy 1≤j≤n and not contained in "i1" to "im". Which of the attributes χ[i1], - - - , χ[im] among the attributes given to the user device 22 to be disclosed can be determined by each user arbitrarily.

The generated signature text "Signature" is sent to the verification device 23 along with the text M and χ[i1], - - - , χ[im]. The verification device 23 executes the verifying unit 231 to check whether or not the signature text "Signature" is generated by a proper method, i.e., whether or not the signature text "Signature" for the document M is generated by the user device 22 that is authenticated to have the attributes χ[i1], - - - , χ[im].

Further, the document M and the signature text "Signature" is also sent to the disclosure device 21 as necessary. The disclosure device 21 can specify the signatory who has generated the signature text by executing the disclosure unit 211.

Figure 3:
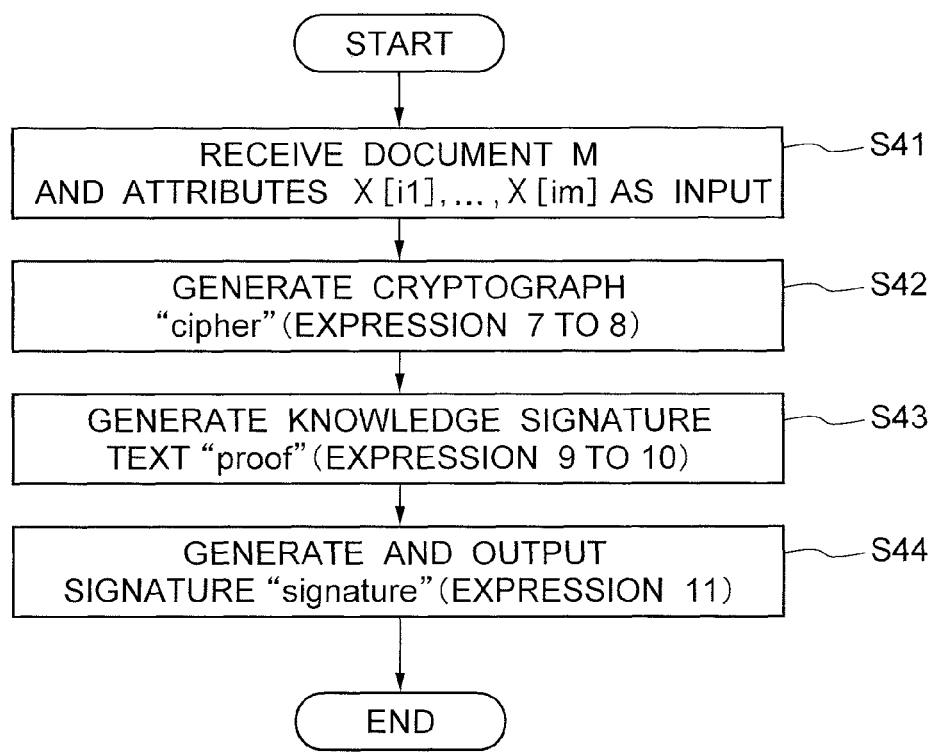
FIG. 3 is a flowchart showing operations of a signature unit operating in the user device shown in FIG. 1.

FIG. 3 is a flowchart showing the operations of the signature unit 221 operating in the user device 22 shown in FIG. 1. First, the cryptograph generating module 221a of the signature unit 221 receives the document M and the attributes χ[i1], - - - , χ[im] to be disclosed by the user as input via the input/output unit 12 of the user device 22 (step S41). Simultaneously, the cryptograph generating module 221a also reads out the system parameter given in advance, the group public key ipk=(Φ, Ψ, Ω, Y, Π), the disclosure public key opk=(Γ, Λ), the user device public key Δ, the user device private key δ, the member certificate (β, κ, E), and the attribute certificate G[i1], - - - , G[im] from the recording unit 13 of the user device 22.

The cryptograph generating module 221a selects τ randomly from Z/qZ from those values, and calculates U shown in Expression 7. Then, the cryptograph generating module 221a outputs a cryptograph "Cipher" shown in Expression 8 acquired by encrypting Δ to the signature text generating module 221b (step S42).

$$U = \Delta \Theta^\tau,\ V = \Lambda^\tau,\ W = \Gamma^\tau \quad \text{[Expression 7]}$$

$$\text{Cipher} = (U, V, W) \quad \text{[Expression 8]}$$

The signature text generating module 221b generates a signature text "proof" of knowledge indicating that it knows (δ, β, κ, F') satisfying Expression 9 from the values outputted from the cryptograph generating module 221a and that "Cipher" is the cryptograph acquired by encrypting A according to the procedure shown in Expression 10 (step S43). At that time, the signature text generating module 221b first selects ξ, d, t, b, x, k from Z/qZ randomly, and executes arithmetic operations shown in Expression 10 thereafter. Note here that Hash' is a hash function taking values in Z/qZ. Further, e(·,·) is bilinear pairing.

$$\Delta = \Theta^\delta$$

and $$e(\Omega \Phi^\delta \Psi^\beta \ldots \text{Hash}(\chi[i_m]), \Gamma) = e(F', \Pi \Gamma^\kappa) \quad \text{[Expression 9]}$$

$$F = EG[i_1] \ldots G[i_m] \Psi^\xi$$

$$P = \Theta^{d+t},\ Q = \Gamma^t,\ R = \Lambda^t$$

$$L = e(\Phi, \Gamma)^d e(\Psi, \Gamma)^b e(\Psi, \Pi)^x e(F, \Pi \Gamma)^{-k}$$

$$C = \text{Hash}(ipk, opk, \chi[i_1] \ldots \chi[i_m], F, P, Q, R, L)$$

$$D = c\delta + d \bmod q, \; T = c\tau + t \bmod q,$$

$$B = c(\beta + \kappa\xi) + b \bmod q, \; X = c\xi + x \bmod q$$

$$K = c\kappa + k \bmod q$$

Proof=(F,c,D,T,B,X,K)  [Expression 10]

The signature output module 221c generates the signature "Signature" shown in Expression 11 from the cryptograph "Cipher" outputted by the cryptograph generating module 221a by executing the arithmetic operation shown in Expression 8 and the signature text "proof" outputted by the signature text generating module 221b by executing the arithmetic operation shown in Expression 10, and outputs it to the verification device 23 along with the document M and the attributes χ[i1], - - - , χ[im].

Signature=(Cipher, Proof)  [Expression 11]

Since Δ=Θ^δ, it is also possible to perform calculation by taking U in Expression 7 described above as U=Θ^(δ+τ).

Figure 4:
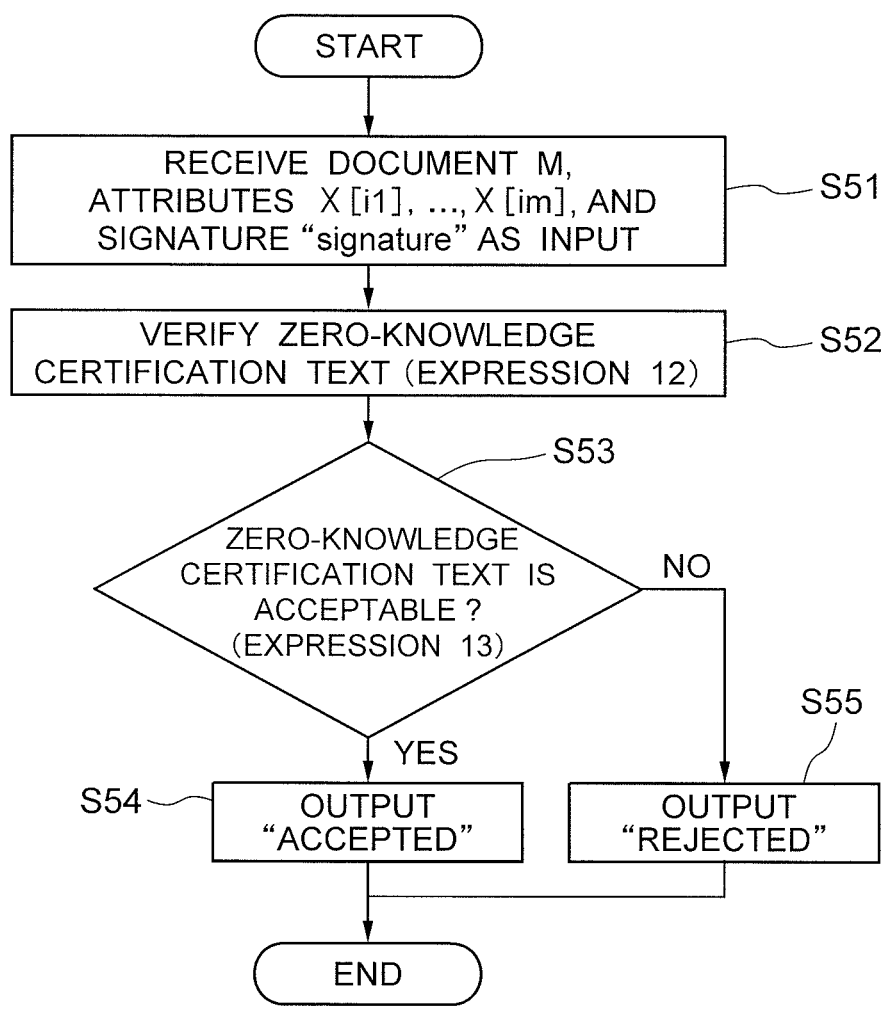
FIG. 4 is a flowchart showing operations of a verifying unit operating in the verification device shown in FIG. 1.

FIG. 4 is a flowchart showing the operations of the verifying unit 231 operating in the verification device 23 shown in FIG. 1. First, the input receiving module 231a receives the document M, the attributes χ[i1], - - - , χ[im], and the signature text "Signature" outputted from the signature unit 221 of the user device 22 as the input (step S51). Simultaneously, the input receiving module 231a also reads out the system parameter, the group public key ipk=(Φ, Ψ, Ω, Y, Π), the disclosure public key opk=(Γ, Λ) from the recording unit 13 of the verification device 23.

The zero-knowledge certification verifying module 231b verifies the zero-knowledge certification text (F, c, D, T, B, X, K) by executing the arithmetic operations shown in Expression 12 by using those numerical values (step S52). Then, under the condition shown in Expression 13, the zero-knowledge certification verifying module 231b judges whether or not the zero-knowledge certification text is acceptable (step S53). When judged as acceptable, the zero-knowledge certification verifying module 231b outputs the result to the input/output unit 12 of the verification device 23 indicating to receive the signature text "Signature" and ends the processing (step S54). If not, the zero-knowledge certification verifying module 231b outputs the result indicating rejection, and ends the processing (step S55).

$$P = \Theta^{X+T} U^{-C}, \; Q = \Gamma^T V^{-C}, \; R = \Lambda^T W^{-C}$$

$$L = e(\Omega,\Gamma)^P e(\Psi,\Gamma)^B e(\Psi,\Pi)^X e(F,\Pi,\Gamma)^{-K}$$

$$e(\Omega \text{Hash}(\chi[i_1])\ldots\text{Hash}(\chi[i_m]),\Gamma)^{-C}$$  [Expression 12]

$$c = \text{Hash}'(ipk, opk, F, P, Q, R, L)$$  [Expression 13]

Figure 5:
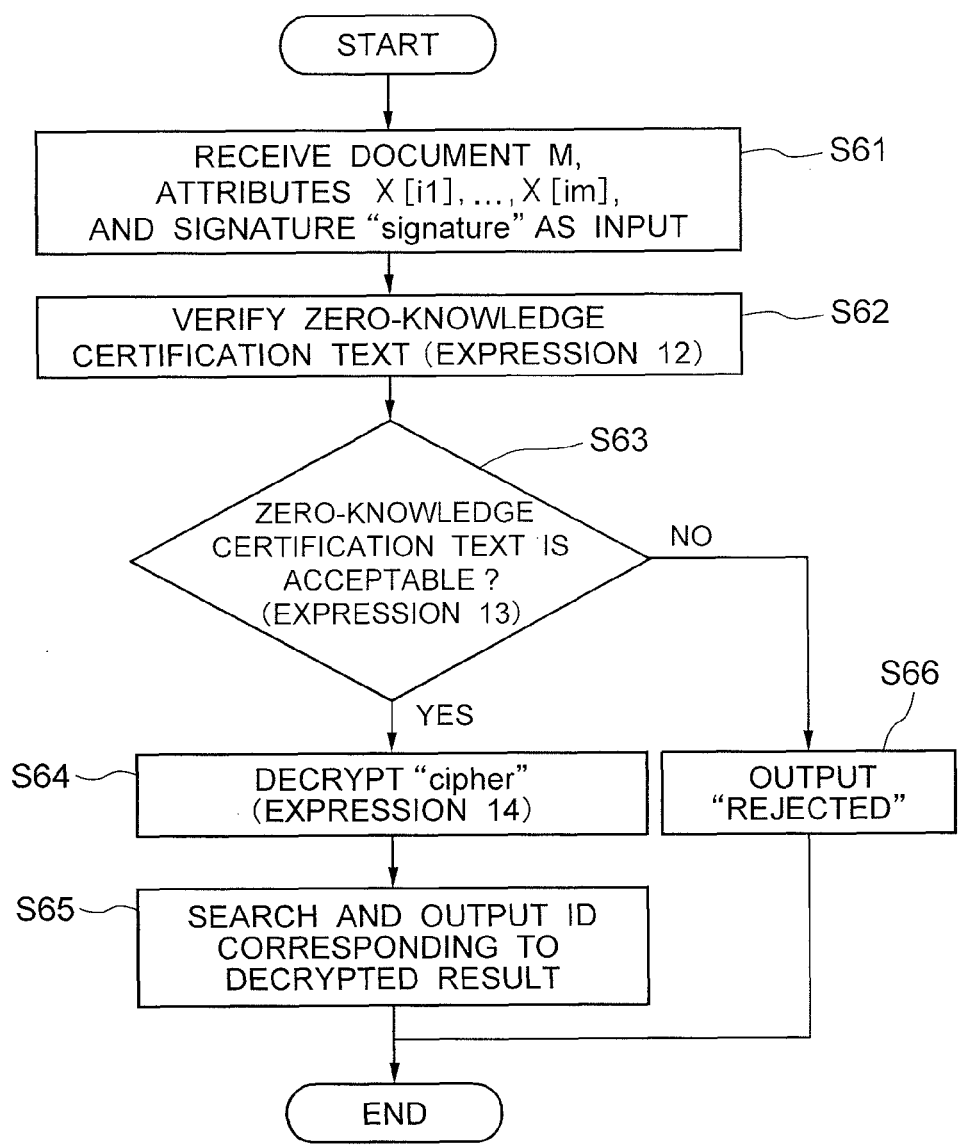
FIG. 5 is a flowchart showing operations of a disclosure unit operating in the disclosure device shown in FIG. 1.

FIG. 5 is a flowchart showing the operations of the disclosure unit 211 operating in the disclosure device 21 shown in FIG. 1. First, the input receiving module 211a receives the document M, the attributes χ[i1], - - - , χ[im], and the signature text "Signature" outputted from the signature unit 221 of the user device 22 as the input (step S61). Simultaneously, the input receiving module 211a also reads out the system parameters, the group public key ipk=(Φ, Ψ, Ω, Y, Π), the disclosure public key opk=(Γ, Λ) from the recording unit 13 of the disclosure device 21.

The zero-knowledge certification verifying module 231b verifies the zero-knowledge certification text (F, c, D, T, B, X, K) by executing the arithmetic operations shown in Expression 12 by using those numerical values (step S62). Then, under the condition shown in Expression 13, the zero-knowledge certification verifying module 231b judges whether or not the zero-knowledge certification text is acceptable (step S63). The steps S61 to S63 described heretofore are the same processing as that of the steps S51 to 53 of FIG. 4.

When the zero-knowledge certification text can be received, the zero-knowledge certification verifying module 231b calculates a decryption result Δ of the cryptograph "Cipher"=(U, V, W) by Expression 14 (step S64), searches an ID corresponding to the decryption result Δ from the list 212, and outputs it to the input/output unit 12 of the disclosure device 21 (step S65). When judged in step S63 that the zero-knowledge certification text is not acceptable, the zero-knowledge certification verifying module 231b outputs the result indicating rejection, and ends the processing (step S66).

$$\Delta = UV^{1/\gamma}$$  [Expression 14]

Second Exemplary Embodiment

The structure of a second exemplary embodiment of the invention will be described by referring to the accompanying drawing FIG. 6.

In addition to the structure where the user device 22 and the verification device 23 are connected mutually, an anonymous authentication signature system 1 according to this exemplary embodiment includes an attribute authentication device 25 connected mutually to the user device and the verification device. The attribute authentication device includes an attribute authentication unit 251 which generates an attribute certificate based on data corresponding to the attributes given to the user and data determined depending on the user private key and the user device.

Further, this system includes an attribute verification device (a user device 22b) connected mutually to the user device, the verification device, and the attribute authentication device. The attribute verification device includes an attribute verifying unit (an attribute authenticator verifying unit 223) which verifies whether or not the attribute certificate is proper based on the data corresponding to the attributes given to the user and the data corresponding to the group to which the user belongs.

Figure 6:
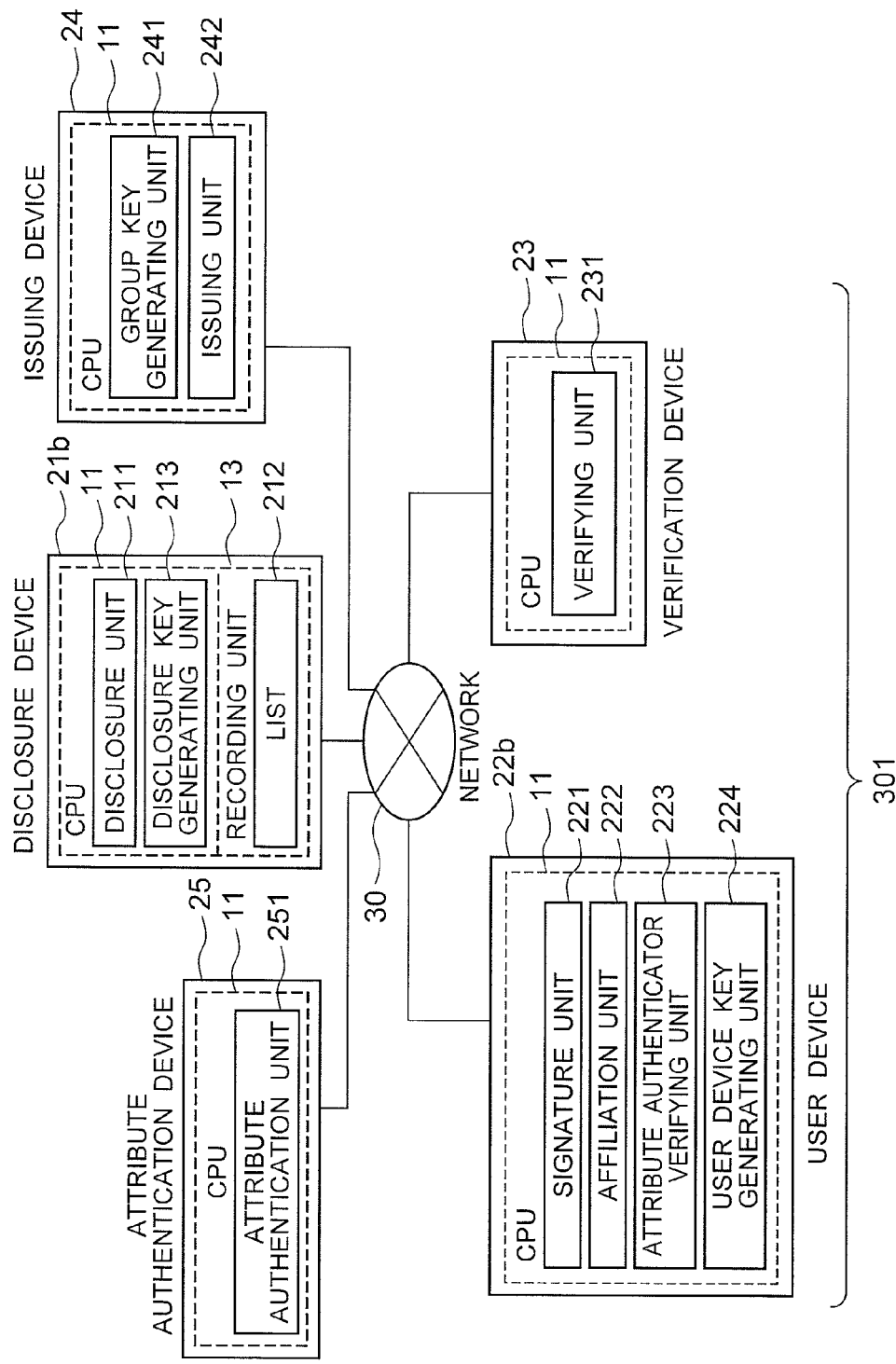
FIG. 6 is an explanatory chart showing the structure of an entire anonymous authentication signature system according to a second exemplary embodiment of the invention.

FIG. 6 is an explanatory chart showing the entire structure of an anonymous authentication signature system 301 according to the second exemplary embodiment of the invention. Compared to the anonymous authentication signature system 1 described in the first exemplary embodiment, the disclosure device 21 and the user device 22 are replaced with a disclosure device 21b and the user device 22b different from those of the first exemplary embodiment in the anonymous authentication signature system 301. The verification device 23 is the same as that of the first exemplary embodiment. Further, in addition to the disclosure device 21b, the user device 22b, and the verification device 23, an issuing device 24 and an attribute authentication device 25 are mutually connected via the same network 30.

The issuing device 24 and the attribute authentication device 25 are both computer devices that are the same as those described in FIG. 2. Further, the issuing device 24 and the attribute authentication device 25 may be the same devices as that of the disclosure device 21 or may be different devices. Furthermore, there may be a plurality of attribute authentication devices 25 depending on the attributes.

In an arithmetic operation unit 11 provided to the issuing device 24, a group key generating unit 241 and an issuing unit 242 operate. Further, in an arithmetic operation unit 11 provided to the attribute authentication device 25, an attribute authentication unit 251 operates. Furthermore, in an arithmetic operation unit 11 provided to the disclosure device 21b, a disclosure key generating unit 213 operates in addition to the disclosure unit 211. Moreover, in an arithmetic operation unit 11 provided to the user device 22b, an affiliation unit 222, the attribute authenticator verifying unit 223, and a user device key generating unit 224 operate in addition to the signature unit 221. These functional units all operate in the respective arithmetic operation units 11 as the computer programs.

The issuing unit 242 adds and erases members to/from the group. The attribute authentication unit 251 generates an attribute certificate. The affiliation unit 222 has a function which affiliates the user to a specific group. The attribute authenticator verifying unit 223 verifies the properness of the attribute certificate generated by the attribute authentication unit 251. The disclosure key generating unit 213 generates a disclosure public key and a disclosure private key.

The group key generating unit 241 generates a group public key and a group private key corresponding thereto. In this exemplary embodiment, a case where the group key generating unit 241 operates in the issuing device 24 is described. However, this may also operate in the attribute authentication device 25.

Figure 7:
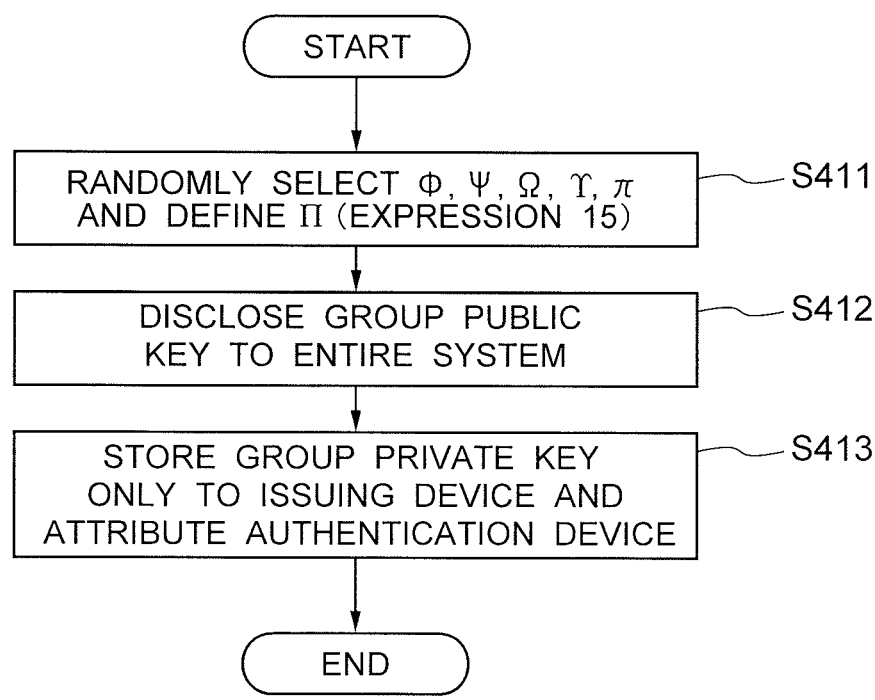
FIG. 7 is a flowchart showing operations of a group key generating unit operating in an issuing device shown in FIG. 6.

FIG. 7 is a flowchart showing operations of the group key generating unit 241 operating in the issuing device 24 shown in FIG. 6. When starting the operations, the group key generating unit 241 first selects $\Phi, \Psi, \Omega$ from GRP[1] randomly, selects Y from GRP[2] randomly, selects $\pi$ from $z/qZ$ randomly, and defines $\Pi$ as in Expression 15 (step S411).

$$\Pi = \Gamma^\pi \qquad \text{[Expression 15]}$$

Then, the group key generating unit 241 discloses a set constituted with $\Phi, \Psi, \Omega, Y, \Pi$ to the entire anonymous authentication signature system 301 as the group public key (step S412). Then, the group key generating unit 241 transmits and stores $\pi$ only to the issuing device 24 and the attribute authentication device 25 as the group private key (step S413).

Figure 8:
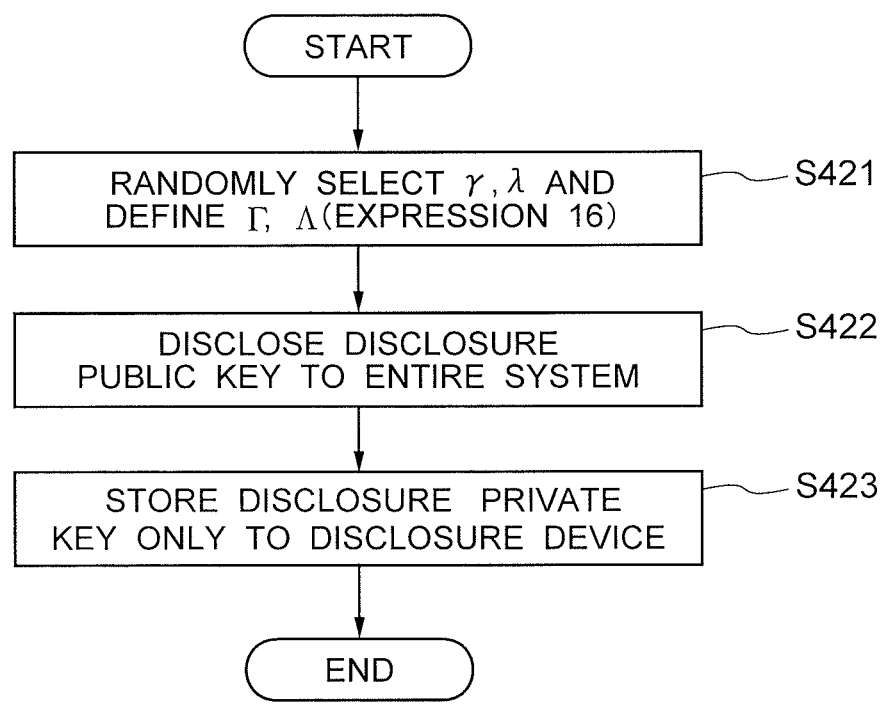
FIG. 8 is a flowchart showing operations of a disclosure key generating unit operating in a disclosure device shown in FIG. 6.

FIG. 8 is a flowchart showing operations of the disclosure key generating unit 213 operating in the disclosure device 21b shown in FIG. 6. When starting the operations, the disclosure key generating unit 213 first selects $\gamma, \lambda$ from $Z/qZ$ randomly, and defines $\Gamma$ and $\Lambda$ as in Expression 16 (step S421). Then, the disclosure key generating unit 241 discloses a set constituted with $\Gamma$ and $\Lambda$ to the entire anonymous authentication signature system 301 as the disclosure public key (step S422). Then, the group key generating unit 241 transmits and stores a set constituted with $\gamma$ and $\lambda$ only to the recording unit 13 of the disclosure device 21b as the disclosure private key (step S423).

$$\Gamma = \Theta^\gamma, \Lambda = \Theta^\lambda \qquad \text{[Expression 16]}$$

Figure 9:
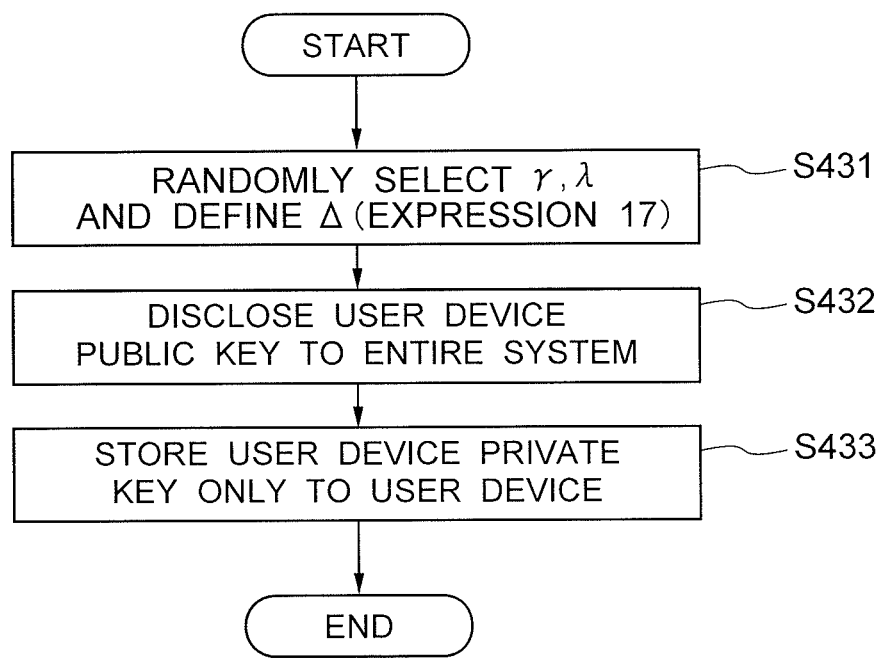
FIG. 9 is a flowchart showing operations of a user device key generating unit operating in a user device disclosed in FIG. 6.

FIG. 9 is a flowchart showing operations of the user device key generating unit 224 operating in the user device 22b shown in FIG. 6. When starting the operations, the user device key generating unit 224 first selects $\gamma, \lambda$ from $Z/qZ$ randomly, and defines $\Delta$ as in Expression 17 (step S431). Then, the user device key generating unit 224 discloses $\Delta$ to the entire anonymous authentication signature system 301 as the user device public key (step S432). Then, the user device key generating unit 224 transmits and stores $\delta$ selected in step S431 only to the recording unit 13 of the user device 22b as the user device private key (step S433).

The user device key generating unit 224 may be structured to operate in a different computer from that of the user device 22b, and the user device 22b may receive the generated user device public key and the user device private key.

$$\Delta = \Theta^\delta \qquad \text{[Expression 17]}$$

Figure 10:
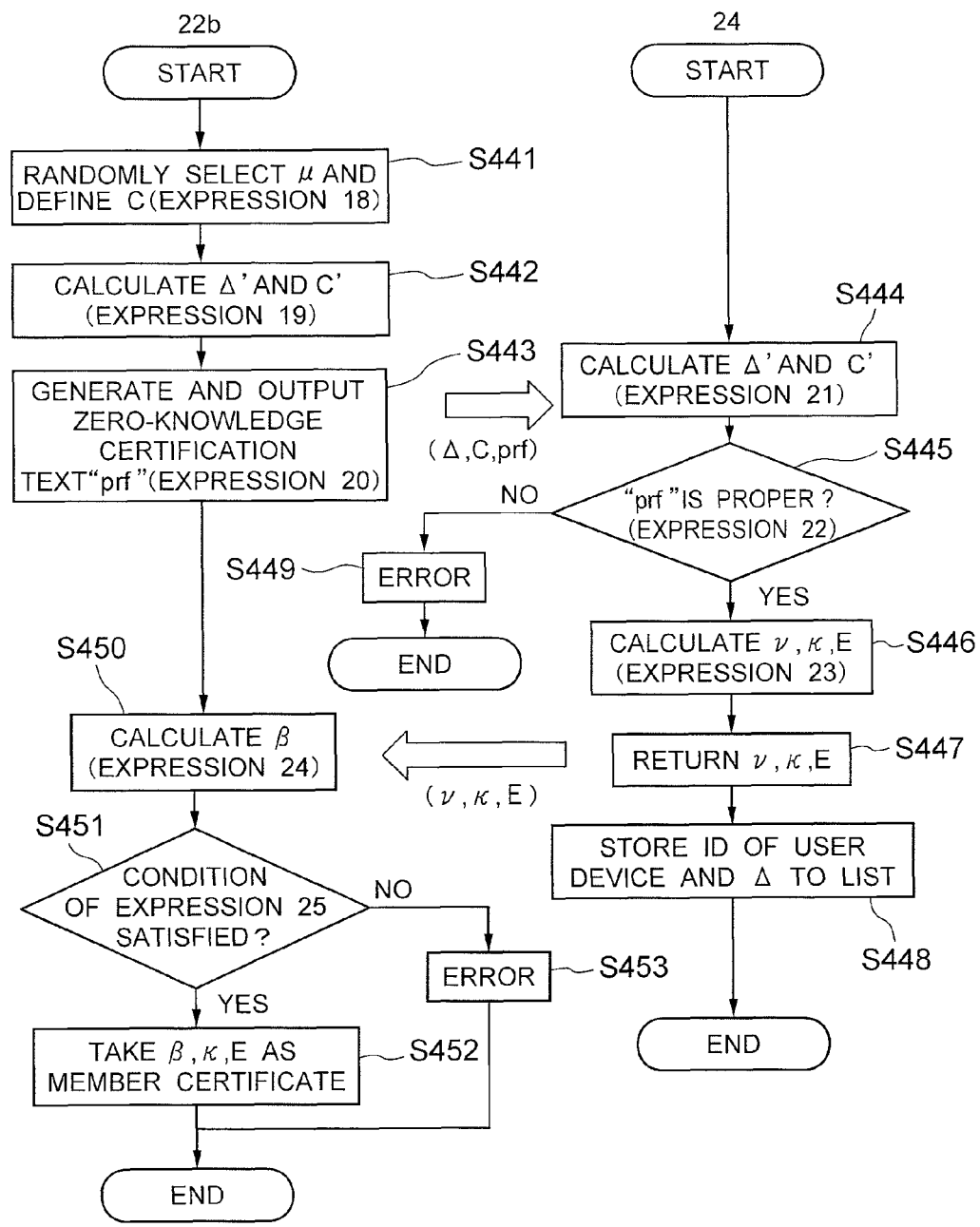
FIG. 10 is a flowchart showing operations of an issuing unit and an affiliation unit operating, respectively, in the issuing device and the user device shown in FIG. 6.

FIG. 10 is a flowchart showing operations of the issuing unit 242 and the affiliation unit 222 operating, respectively, in the issuing device 24 and the user device 22b shown in FIG. 6. When starting the operations, the affiliation unit 222 first selects $\mu$ from $Z/qZ$ randomly, and defines C as in Expression 18 (step S441). Then, the affiliation unit 222 selects $\delta', \mu'$ from $Z/qZ$ randomly, calculates $\Delta'$ and $C'$ shown in Expression 19, generates a zero-knowledge certification text "prf" in the procedure shown in Expression 20 (step S442), and transmits $(\Delta, C, \text{prf})$ to the issuing device 24 (step S443).

$$C = \Phi^\delta \Psi^\mu \qquad \text{[Expression 18]}$$

$$\Delta' = \Theta^{\delta'}, C' = \Phi^{\delta'} \Psi^{\mu'} \qquad \text{[Expression 19]}$$

$$c' = \text{Hash}'(\Delta', C')$$

$$\delta'' = c'\delta + \delta' \bmod q, \mu'' = c'\mu + \mu' \bmod q$$

$$\text{prf} = (c', \delta'', \mu'') \qquad \text{[Expression 20]}$$

The issuing unit 242 of the issuing device 24 upon receiving $(\Delta, C, \text{prf})$ first performs calculation of Expression 21, verifies the properness of "prf" based on the condition of Expression 22 (step S444 to 445), receives it when verified as proper, performs calculation of Expression 23, returns $(\upsilon, \kappa, E)$ to the user device 22b (step S446 to 7), and further transmits a set of the ID of the user device 22b and $\Delta$ to the disclosure device 21 to have it stored to the list 212 (step S448). When verified in step S445 that "prf" is improper, the issuing unit 242 returns "error" to the user device 22b and ends the processing (step S449).

$$\Delta' = \Theta^{\delta''} \Delta^{-c'}, C' = \Phi^{\delta''} \Psi^{\mu''} C^{-c'} \qquad \text{[Expression 21]}$$

$$c' = \text{Hash}'(\Delta', C') \qquad \text{[Expression 22]}$$

$$E = (\Omega C \Psi^\nu)^{\pi + \kappa} \qquad \text{[Expression 23]}$$

The user device 22b to which $(\upsilon, \kappa, E)$ is returned from the issuing device 24 in step S447 calculates $\beta$ shown in Expression 24, and judges whether it satisfies the condition shown in Expression 25 (steps S450 to 451). When judged as satisfying the condition, the user device 22b executes normal termination of the protocol by having $(\beta, \kappa, E)$ as the member certificate (step S452). If not, the user device 22b executes abnormal termination of the protocol (step S453).

$$\beta = \mu + \nu \bmod q \qquad \text{[Expression 24]}$$

$$e(\Omega \Phi^\delta \Psi^\beta, \Gamma) = e(E, \Pi \Gamma^\kappa) \qquad \text{[Expression 25]}$$

Figure 11:
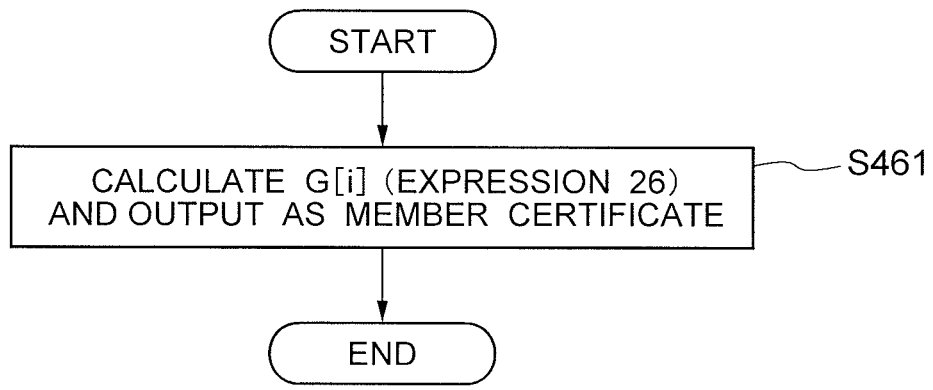
FIG. 11 is a flowchart showing operations of an attribute authentication unit operating in an attribute authentication device shown in FIG. 6.

FIG. 11 is a flowchart showing operations of the attribute authentication unit 251 operating in the attribute authentication device 25 shown in FIG. 6. The attribute authentication unit 251 issues an attribute certificate regarding the attribute $\chi$ to the user device 22b that has the attribute $\chi[i]$. At that time, the attribute authentication unit 251 calculates G[i] by the processing shown as Expression 26, and outputs it as a member certificate (step S461). Note here that $\kappa$ is a part of the member certificate of the user device 22b.

$$G[i] = \text{Hash}(\chi[i])^{1/(\pi + \kappa)} \qquad \text{[Expression 26]}$$

It is not an issue how the attribute authentication device 25 acquires $\kappa$. However, from the viewpoint of the security, it is desirable that the attribute authentication device 25 checks that $\kappa$ is actually a part of the member certificate of the user device 22b by some kind of method. More specifically, there are following methods, i.e., a method with which the issuing device 24 gives a signature to $\kappa$, and the attribute authentication device 25 checks the signature, a method with which the issuing device 24 discloses in advance a corresponding table of the user device 22b and κ, etc.

Figure 12:
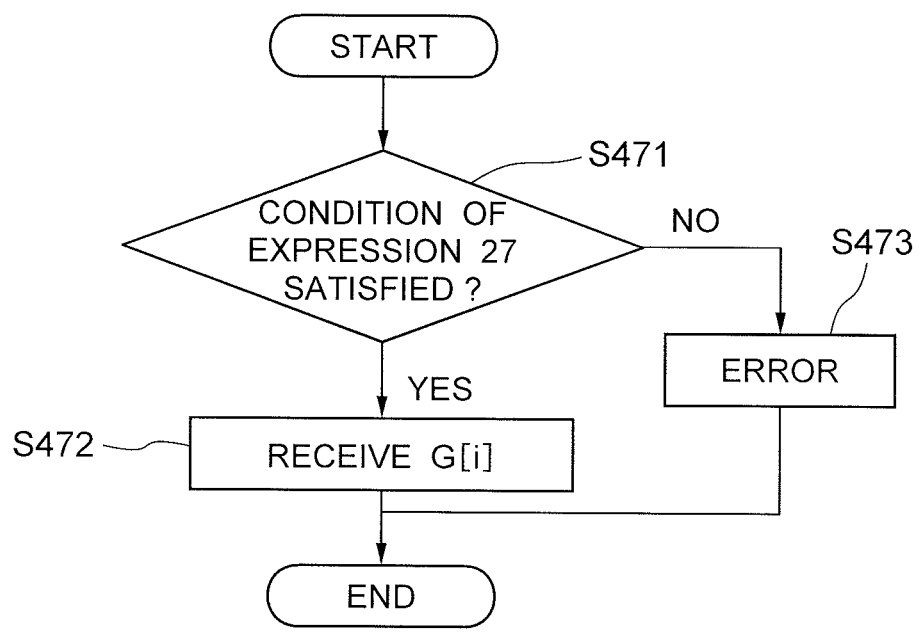
FIG. 12 is a flowchart showing operations of a verifying unit operating in the user device shown in FIG. 6.

FIG. 12 is a flowchart showing operations of the attribute authenticator verifying unit 223 operating in the user device 22b shown in FIG. 6. The user device 22b executes the attribute authenticator verifying unit 223 to verify the properness of the attribute certificate issued by the attribute authentication device 25. At that time, the attribute authenticator verifying unit 223 judges the properness of G[i] based on the fact whether or not the condition shown as Expression 27 applies (step S471). When judged as proper, the attribute authenticator verifying unit 223 receives G[i] (step S472) and, if not, rejects it (step S473).

$$e(G[i], \Pi\Gamma^\kappa) = e(\text{Hash}(\chi[i]), \Pi) \quad \text{[Expression 27]}$$

Entire Operations of First and Second Exemplary Embodiments

Next, the entire operations of the exemplary embodiments will be described. The signature method according to the present invention is a signature method which generates and outputs signature data for a document inputted from a user. The signature method stores in advance system parameters as respective parameters given in advance, a disclosure public key, a user public key, a user private key, and a member certificate as well as an attribute certificate generated by using a same power as that of the user public key and receives a document from a user and an attribute the user is to disclose as input (FIG. 3: step S41), generates a cryptograph based on the inputted document, the attribute to be disclosed, and each of the parameters (FIG. 3: step S42), generates a zero-knowledge signature text from the generated cryptograph (FIG. 3: step S43), and outputs the cryptograph and the zero-knowledge signature text as signature data (FIG. 3: step S44).

Further, the verification method according to the present invention is a verification method which verifies whether or not the signature data generated by the user device is proper and outputs the result thereof. The verification method stores in advance system parameters as respective parameters given in advance, a disclosure public key, and an attribute certificate, and receives a document from a user and signature data as input (FIG. 4: step S51), verifies a zero-knowledge certification text contained in the signature data by using each of the parameters to judge whether or not the zero-knowledge certification text is acceptable (FIG. 4: step S52 to 53) and receives the signature data when judged as acceptable (FIG. 4: step S54).

Regarding each of the operation steps, it is also possible to put those into programs that can be executed by a computer and to cause the user device 22 or the verification device 23 as the main body that directly executes each of the steps to execute those.

The exemplary embodiments (first and second exemplary embodiments) can provide following effects with the structure and the operations.

The exemplary embodiments use the group having not RSA but the bilinear pairing, so that it is possible to shorten the signature length and to make the processing more efficient. Further, separately from (β, E, κ), G[i] is generated for each attribute χ[i] with Expression 6 described above, and G[i] is used as the certificate for certifying that the user has the attribute χ[i].

Note that it is possible to show that Expression 6 described above is equivalent to a following Expression 28 by using (Y, Π) that satisfies Π=Y^π.

$$e(\text{Hash}(\chi[i]), \Gamma) = e(G[i], \Pi\Gamma^\kappa) \quad \text{[Expression 28]}$$

Each of those shown in Expression 29 uses same power π+κ. Through combining those equations into an equation shown in Expression 30, Expression 31 can be acquired.

$$\Omega\Phi^\delta\Psi^\beta = E^{\pi+\kappa}$$

$$\text{Hash}(\chi[i]) = G[i]^{\pi+\kappa} \quad \text{[Expression 29]}$$

$$F' = EG[i_1] \ldots G[i_m] \quad \text{[Expression 30]}$$

$$\Omega\Phi^\delta\Psi^\beta \text{Hash}(\chi[i]) \ldots \text{Hash}(\chi[i_m]) = F'^{\pi+\kappa}$$

$$e(\Omega\Phi^\delta\Psi^\beta \text{Hash}(\chi[i_1]) \ldots \text{Hash}(\chi[i_m]), \Gamma) = e(F', \Pi\Gamma^\kappa) \quad \text{[Expression 31]}$$

Therefore, the user can generate a signature of knowledge (δ, β, F', κ) satisfying Expression 31 described above by having χ[i1], ..., χ[im] as the attributes to be disclosed. There are only three kinds of δ, β, F' as the data that needs to be certified, so that a great amount of calculation proportional to the number of attributes to be disclosed is not required.

As described above, in the exemplary embodiment, the number of pieces of data E, G[i1], ---, G[im] proportional to the number of attributes to be disclosed is contracted to a single piece of data F'=EG[i1] --- G[im] shown in Expression 30 by combining each of the equations shown in Expression 29 using the same power π+κ. This makes it possible to reduce the number of pieces of data that are required to be certified in anonymous authentication and to reduce the amount of required calculation dramatically.

While the present invention has been described by referring to the specific embodiments illustrated in the drawings, the present invention is not limited only to those embodiments described above. Any other known structures can be employed, as long as the effects of the present invention can be achieved therewith.

This Application claims the Priority right based on Japanese Patent Application No. 2009-164884 filed on Jul. 13, 2009 and the disclosure thereof is hereby incorporated by reference in its entirety.

INDUSTRIAL APPLICABILITY

The present invention can be utilized in systems and devices using anonymous authentication.

REFERENCE NUMERALS 1, 301 Anonymous authentication signature system
10 Computer device
11 Arithmetic operation unit
12 Input/output unit
13 Recording unit
14 Communication unit
21, 21b Disclosure device
22, 22b User device
23 Verification device
24 Issuing device
25 Attribute authentication device
30 Network
211 Disclosure unit
212 List
213 Disclosure key generating unit
221 Signature unit
221a Cryptograph generating module
221b Signature text generating module
221c Signature output module
222 Affiliation unit 223 Attribute authenticator verifying unit
224 User device key generating unit
231 Verifying unit
231a Input receiving module
231b Zero-knowledge certification verifying module
241 Group key generating unit
242 Issuing unit

The invention claimed is:

1. An anonymous authentication signature system constituted by mutually connecting a user device which generates and outputs signature data for a document inputted by a user and a verification device which verifies whether or not the signature data generated by the user device is proper and outputs a result thereof, wherein:
the user device includes
a first recording unit which stores first system parameters as respective first parameters given in advance, a disclosure public key, a user public key, a user private key, a member certificate, and an attribute certificate,
an input/output unit which receives input of the document from the user and a plurality of attributes the user intends to disclose,
a cryptograph generator which generates a cryptograph based on at least two from among the first parameters,
a signature text generator which generates a signature text from the cryptograph and generates a zero-knowledge signature text from the attribute certificate corresponding to each of the attributes to be disclosed, and
a signature outputter which outputs the cryptograph and the zero-knowledge signature text as the signature data, along with the document and the plurality of attributes to be disclosed;
the verification device includes
a second recording unit which stores second system parameter as respective second parameters given in advance, the disclosure public key, the user public key, and the attribute certificate,
an input receiver which receives the input of the document and the signature data from the user device, and
a zero-knowledge certification verifier which judges whether or not a zero-knowledge certification text contained in the signature data is acceptable by verifying the zero-knowledge certification text contained in the signature data by using each of the second parameters, and receives the signature data when judged as acceptable;
the user public key and the attribute certificate are generated by using a same power;
the signature data contains a first element which does not include the plurality of attributes to be disclosed and includes the user private key, and a second element which includes the plurality of attributes to be disclosed and does not include the user private key; and
the signature text generator of the user device combines a part of the user public key and a part of the attribute certificate corresponding to an attribute that is disclosed to generate the zero-knowledge signature text showing that the combined data satisfies an expression defined in advance.

2. The anonymous authentication signature system as claimed in claim 1, wherein:
the first recording unit of the user device stores a group public key and a group private key as respective parameters given in advance; and
the cryptograph generator of the user device generates the cryptograph based on data corresponding to the attribute to be disclosed in the attribute certificate, the user public key, the user private key, the group public key, and the group private key.

3. The anonymous authentication signature system as claimed in claim 1, wherein
the signature text generator of the user device generates a zero-knowledge signature text for a fact that the cryptograph generated by the cryptograph generator is a cryptograph of data contained in the user public key.

4. The anonymous authentication signature system as claimed in claim 1, wherein:
the input receiver of the verification device receives the input of the data of the attribute disclosed by the user; and
the zero-knowledge certification verifier of the verification device verifies the zero-knowledge certification text contained in the signature data by using the attribute disclosed by the user and each of the parameters.

5. The anonymous authentication signature system as claimed in claim 4, wherein:
the second recording unit of the verification device stores a group public key as the parameter given in advance; and
the zero-knowledge certification verifier of the verification device verifies the zero-knowledge certification text contained in the signature data based on data corresponding to the attribute disclosed by the user, the user public key, the group public key, and the group private key.

6. The anonymous authentication signature system as claimed in claim 1, comprising an attribute authentication device connected mutually to the user device and the verification device, wherein
the attribute authentication device includes an attribute authenticator which generates the attribute certificate based on the data corresponding to an attribute given to the user and data determined depending on the user private key and the user device.

7. The anonymous authentication signature system as claimed in claim 6, comprising an attribute verification device connected mutually to the user device, the verification device, and the attribute authentication device, wherein
the attribute verification device includes an attribute verifier which verifies whether or not the attribute certificate is proper based on the data corresponding to the attribute given to the user and data corresponding to a group to which the user belongs.

8. A user device which generates and outputs signature data for a document inputted by a user, the user device comprising:
a recording unit which stores system parameters as respective parameters given in advance, a disclosure public key, a user public key, a user private key, a member certificate, and an attribute certificate;
an input/output unit which receives input of the document from the user and a plurality of attributes the user intends to disclose;
a cryptograph generator which generates a cryptograph based on at least two from among the parameters;
a signature text generator which generates a signature text from the cryptograph and generates a zero-knowledge signature text from the generated cryptograph and the attribute certificate corresponding to each of the attributes to be disclosed; and
a signature outputter which outputs the cryptograph and the zero-knowledge signature text as the signature data, along with the document and the plurality of attributes to be disclosed, wherein the user public key and the attribute certificate are generated by using a same power;

the signature data contains a first element which does not include the plurality of attributes to be disclosed and includes the user private key, and a second element which includes the plurality of attributes to be disclosed and does not include the user private key; and the signature text generator combines a part of the user public key and a part of the attribute certificate corresponding to an attribute that is not disclosed to generate the zero-knowledge signature text showing that the combined data satisfies an expression defined in advance.

9. A verification device which verifies whether or not signature data generated by a user device is proper and outputs a result thereof, the verification device comprising:

a recording unit which stores system parameters as respective parameters given in advance, a disclosure public key, a user public key, and an attribute certificate;

an input receiver which receives input of a document from a user and the signature data; and a zero-knowledge certification verifier which judges whether or not a zero-knowledge certification text contained in the signature data is acceptable by verifying the zero-knowledge certification text contained in the signature data by using each of the parameters, and receives the signature data when judged as acceptable, wherein the user public key and the attribute certificate are generated by using a same power, and the signature data contains a first element which does not include a plurality of attributes the user intends to disclose and includes a user private key, and a second element which includes the plurality of attributes to be disclosed and does not include the user private key.

10. A signature method which generates and outputs signature data for a document inputted by a user, the method comprising:

storing in advance system parameters as respective parameters given in advance, a disclosure public key, a user public key, a user private key, and a member certificate as well as an attribute certificate generated by using a same power as that of the user public key;

receiving input of the document from the user and a plurality of attributes the user intends to disclose;

generating, using a cryptograph generator, a cryptograph based on at least two from among the parameters;

combining, using a signature text generator, a part of the user public key and a part of the attribute certificate corresponding to an attribute that is not disclosed to generate a zero-knowledge signature text showing that the combined data satisfies an expression defined in advance; and outputting, using a signature outputter, the cryptograph and the zero-knowledge signature text as the signature data, along with the document and the plurality of attributes to be disclosed, wherein the signature data contains a first element which does not include the plurality of attributes to be disclosed and includes the user private key, and a second element which includes the plurality of attributes to be disclosed and does not include the user private key.

11. A verification method which verifies whether or not signature data generated by a user device is proper and outputs a result thereof, the method comprising:

storing in advance system parameters as respective parameters given in advance, a disclosure public key, a user public key, and an attribute certificate generated by using a same power as that of the user public key;

receiving input of a document from a user and the signature data;

judging, using a zero-knowledge certification verifier, whether or not a zero-knowledge certification text contained in the signature data is acceptable by verifying the zero-knowledge certification text contained in the signature data by using each of the parameters; and receiving, using an input receiver, the signature data when judged as acceptable, wherein the signature data contains a first element which does not include a plurality of attributes the user intends to disclose and includes a user private key, and a second element which includes the plurality of attributes to be disclosed and does not include the user private key.

12. A non-transitory computer readable recording medium storing a signature program for generating and outputting signature data for a document inputted by a user, the program causing a computer which stores in advance system parameters as respective parameters given in advance, a disclosure public key, a user public key, a user private key, and a member certificate as well as an attribute certificate generated by using a same power as that of the user public key to execute:

a procedure for receiving input of the document from the user and a plurality of attributes the user intends to disclose;

a procedure for generating, using a cryptograph generator, a cryptograph based on at least two from among the parameters;

a procedure for combining, using a signature text generator, a part of the user public key and a part of the attribute certificate corresponding to an attribute that is not disclosed to generate a zero-knowledge signature text showing that the combined data satisfies an expression defined in advance; and a procedure for outputting, using a signature outputter, the cryptograph and the zero-knowledge signature text as the signature data, along with the document and the plurality of attributes to be disclosed, wherein the signature data contains a first element which does not include the plurality of attributes to be disclosed and includes the user private key, and a second element which includes the plurality of attributes to be disclosed and does not include the user private key.

13. A non-transitory computer readable recording medium storing a verification program for verifying whether or not signature data generated by a user device is proper and outputting a result thereof, the program causing a computer which stores in advance system parameters as respective parameters given in advance, a disclosure public key, a user public key, and an attribute certificate generated by using a same power as that of the user public key to execute:

a procedure for receiving input of the document from a user and the signature data;

a procedure for judging, using a zero-knowledge certification verifier, whether or not a zero-knowledge certification text contained in the signature data is acceptable by verifying the zero-knowledge certification text contained in the signature data by using each of the parameters; and a procedure for receiving, using an input receiver, the signature data when judged as acceptable, wherein the signature data contains a first element which does not include a plurality of attributes the user intends to disclose and includes a user private key, and a second element which includes the plurality of attributes to be disclosed and does not include the user private key.

14. An anonymous authentication signature system constituted by mutually connecting user means for generating and outputting signature data for a document inputted by a user and verification means for verifying whether or not the signature data generated by the user device is proper and outputting a result thereof, wherein:
the user means includes:
first recording means for storing first system parameters as respective first parameters given in advance, a disclosure public key, a user public key, a user private key, a member certificate, and an attribute certificate,
input/output means for receiving input of the document from the user and a plurality of attributes the user intends to disclose,
cryptograph generating means for generating a cryptograph based on at least two from among the first parameters,
signature text generating means for generating a signature text from the cryptograph and for generating a zero-knowledge signature text from the attribute certificate corresponding to each of the attributes to be disclosed, and
signature output means for outputting the cryptograph and the zero-knowledge signature text as the signature data, along with the document and the plurality of attributes to be disclosed;
the verification means includes:
second recording means for storing second system parameter as respective second parameters given in advance, the disclosure public key, the user public key, and the attribute certificate,
input receiving means for receiving the input of the document and the signature data from the user means, and
zero-knowledge certification verifying means for judging whether or not a zero-knowledge certification text contained in the signature data is acceptable by verifying the zero-knowledge certification text contained in the signature data by using each of the second parameters, and receiving the signature data when judged as acceptable;
the user public key and the attribute certificate are generated by using a same power; and
the signature text generating means of the user means combines a part of the user public key and a part of the attribute certificate corresponding to an attribute that is disclosed to generate the zero-knowledge signature text showing that the combined data satisfies an expression defined in advance,
wherein the signature data contains a first element which does not include the plurality of attributes to be disclosed and includes the user private key, and a second element which includes the plurality of attributes to be disclosed and does not include the user private key.

15. User means for generating and outputting signature data for a document inputted by a user, the user device comprising:

recording means for storing system parameters as respective parameters given in advance, a disclosure public key, a user public key, a user private key, a member certificate, and an attribute certificate;
input/output means for receiving input of the document from the user and a plurality of attributes the user intends to disclose;
cryptograph generating means for generating a cryptograph from at least two from among the parameters;
signature text generating means for generating a signature text from the cryptograph and for generating a zero-knowledge signature text from the attribute certificate corresponding to each of the attributes to be disclosed; and
signature output means for outputting the cryptograph and the zero-knowledge signature text as the signature data, along with the document and the plurality of attributes to be disclosed,
wherein:
the user public key and the attribute certificate are generated by using a same power;
the signature text generating means combines a part of the user public key and a part of the attribute certificate corresponding to an attribute that is not disclosed to generate the zero-knowledge signature text showing that the combined data satisfies an expression defined in advance, and
the signature data contains a first element which does not include the plurality of attributes to be disclosed and includes the user private key, and a second element which includes the plurality of attributes to be disclosed and does not include the user private key.

16. Verification means for verifying whether or not signature data generated by a user device is proper and outputs a result thereof, the verification means comprising:
recording means for storing system parameters as respective parameters given in advance, a disclosure public key, a user public key, and an attribute certificate;
input receiving means for receiving input of a document from a user and the signature data; and
zero-knowledge certification verifying means for judging whether or not a zero-knowledge certification text contained in the signature data is acceptable by verifying the zero-knowledge certification text contained in the signature data by using each of the parameters, and receiving the signature data when judged as acceptable,
wherein the user public key and the attribute certificate are generated by using a same power, and
wherein the signature data contains a first element which does not include a plurality of attributes the user intends to disclose and includes a user private key, and a second element which includes the plurality of attributes to be disclosed and does not include the user private key.

* * * * *

UNITED STATES PATENT AND TRADEMARK OFFICE
CERTIFICATE OF CORRECTION

PATENT NO. : 8,949,609 B2  
APPLICATION NO. : 13/383476  
DATED : February 3, 2015  
INVENTOR(S) : Isamu Teranishi Page 1 of 2

It is certified that error appears in the above-identified patent and that said Letters Patent is hereby corrected as shown below:

In the Specification

Column 10, Line 67: Delete " $C'=\text{Hash}(ipk, opk, \chi[i_1] \ldots \chi[i_m], F, P, Q, R, L)$ " and insert -- $C = \text{Hash}'(ipk, opk, \gamma[i_1] \ldots \gamma[i_m], F, P, Q, R, L)$ --

Column 11, Line 47: Delete " $L = e(\Omega, \Gamma)^D e(\Psi, \Gamma)^B e(\Psi, \Pi)^X e(F, \Pi, \Gamma)^{-K}$ " and insert -- $L = e(\Phi, \Upsilon)^D e(\Psi, \Upsilon)^B e(\Psi, \Pi)^X e(F, \Pi \Upsilon)^{-K}$ --

Column 16, Line 9: Delete " $F' = EG[i_1] \ldots G i_m$ " and insert -- $F' = EG[i_1] \ldots G[i_m]$ --

Column 16, Line 13: Delete " $\Omega \Phi^\delta \Psi^\beta \text{Hash}(\chi[i]) \ldots \text{Hash}(\chi[i_m]) = F^{\alpha\tau+\kappa}$ " and insert -- $\Omega \Phi^\delta \Psi^\beta \text{Hash}(\chi[i_1]) \ldots \text{Hash}(\chi[i_m]) = F'^{\pi \cdot \kappa}$ --

Signed and Sealed this  
Twentieth Day of October, 2015

Michelle K. Lee  
*Director of the United States Patent and Trademark Office*

CERTIFICATE OF CORRECTION (continued)
U.S. Pat. No. 8,949,609 B2

In the Claims

Column 19, Line 10: In Claim 8, delete "is not" and insert -- is --

Column 19, Line 48: In Claim 10, delete "is not" and insert -- is --

Column 20, Line 32: In Claim 12, delete "is not" and insert -- is --

Column 22, Line 25: In Claim 15, delete "is not" and insert -- is --